(12) United States Patent
Chen (10) Patent No.: US 6,244,136 B1
(45) Date of Patent: Jun. 12, 2001

(54) FOOT CLEAT FOR SECURING A CYCLIST'S SHOE TO A BICYCLE PEDAL

(76) Inventor: Chung-I Chen, No. 3, Kung-Chi Rd., Yu-Ssi-Kung-Yeh Dist., Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/140,882

(22) Filed: Aug. 27, 1998

(51) Int. Cl.$^7$ ............................... B62M 3/08; A43B 5/14

(52) U.S. Cl. ........................................... 74/594.6; 36/131

(58) Field of Search .................. 74/594.6, 594.4; 36/131

(56) References Cited

U.S. PATENT DOCUMENTS

| | | | | |
|---|---|---|---|---|
| 4,827,797 | * | 5/1989 | Le Faou et al. ..................... | 74/594.6 |
| 5,497,680 | * | 3/1996 | Nagano ............................... | 74/594.6 |
| 5,685,093 | * | 11/1997 | Lin ..................................... | 74/594.6 X |
| 5,848,560 | * | 12/1998 | Lin ..................................... | 74/594.6 |

FOREIGN PATENT DOCUMENTS

2561502 * 9/1985 (FR) ................................... 74/594.6

* cited by examiner

Primary Examiner—Mary Ann Battista
(74) Attorney, Agent, or Firm—Akin, Gump, Strauss, Hauer & Feld L.L.P.

(57) ABSTRACT

A foot cleat includes a foot cleat body with a second engaging major surface adapted for facing toward a first engaging surface of a pedal body. The foot cleat body is formed with an elongate lock slot extending in a transverse direction, and two lock holes in two opposite sides relative to the elongate lock slot and aligned in a longitudinal direction. Two friction members are disposed in two lateral portions of the foot cleat body and extend outwardly of the second major engaging surface to abut against two tread walls of the pedal body to prevent slippage of the foot cleat body relative to the pedal body. Screw fasteners are passed through the elongate lock slot and/or the lock holes in such a manner that the screw fasteners are adjustably positioned at the elongate lock slot which is adapted for registering with the screw holes in the bottom surface of the sole of a cyclist's shoe so as to be engaged selectively and threadedly in the corresponding ones of the screw holes.

9 Claims, 10 Drawing Sheets

FOOT CLEAT FOR SECURING A CYCLIST'S SHOE TO A BICYCLE PEDAL

BACKGROUND OF THE INVENTION

1. Field of the Invention

This invention relates to a foot cleat, more particularly to a foot cleat for securing a cyclist's shoe, to a bicycle pedal suitable for both racing bicycles and mountaineering bicycles.

2. Description of the Related Art

Figure 1:
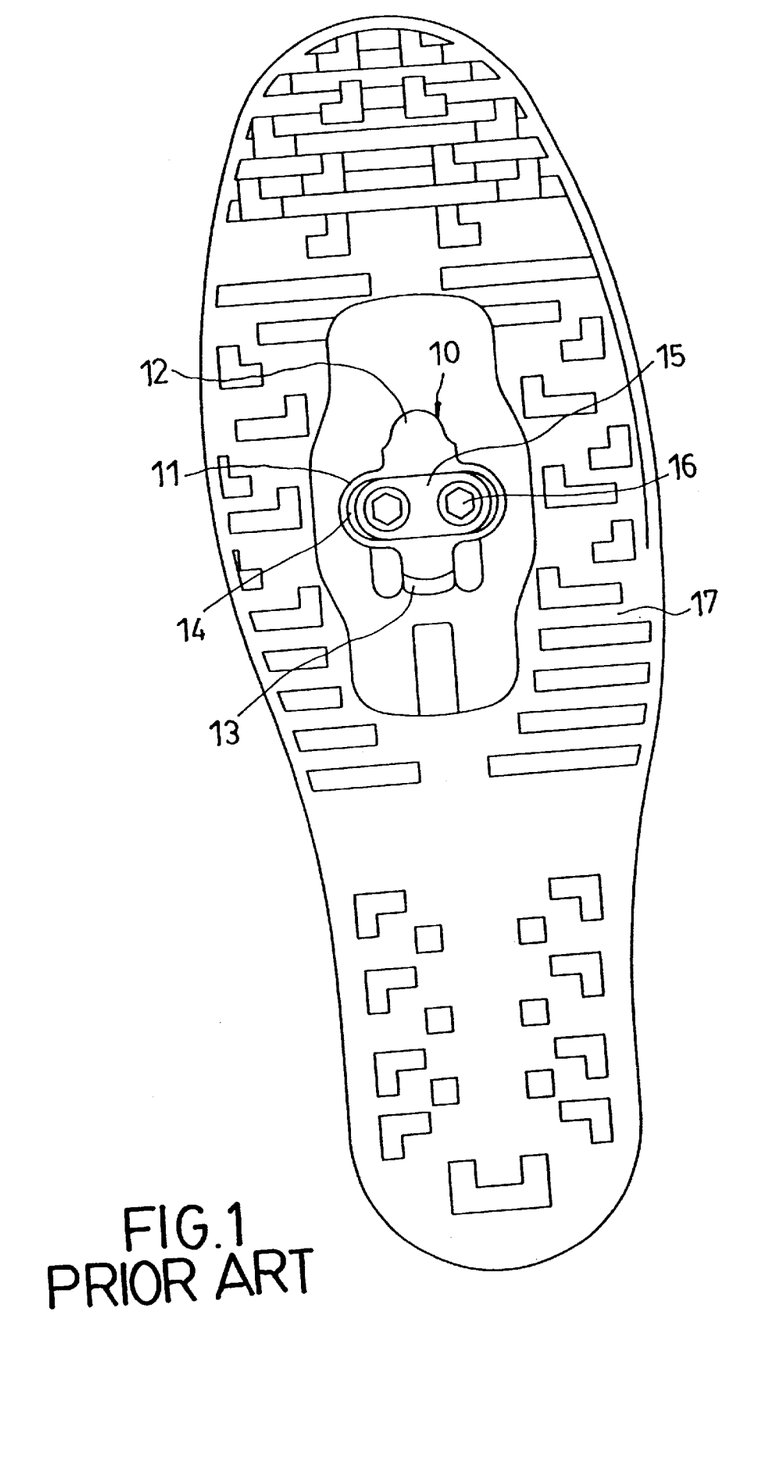
FIG. 1 is a schematic view of a conventional toe cleat on the pedal of a racing bicycle fastened on a cyclist's shoe.

FIG. 1 shows a toe cleat 10 made of metal material for attaching fixedly the sole of a cyclist's shoe to a pedal body (not shown). The toe cleat 10 has front and rear engaging portions 12, 13 for engagement with the pedal body, and an intermediate portion 11 having an elongate transverse slot 14 for receiving an elongate washer 15 and two lock holes into which two screws 16 may be inserted so as to fix the toe cleat 10 on the bottom surface 17 of the sole of the shoe.

Figure 2:
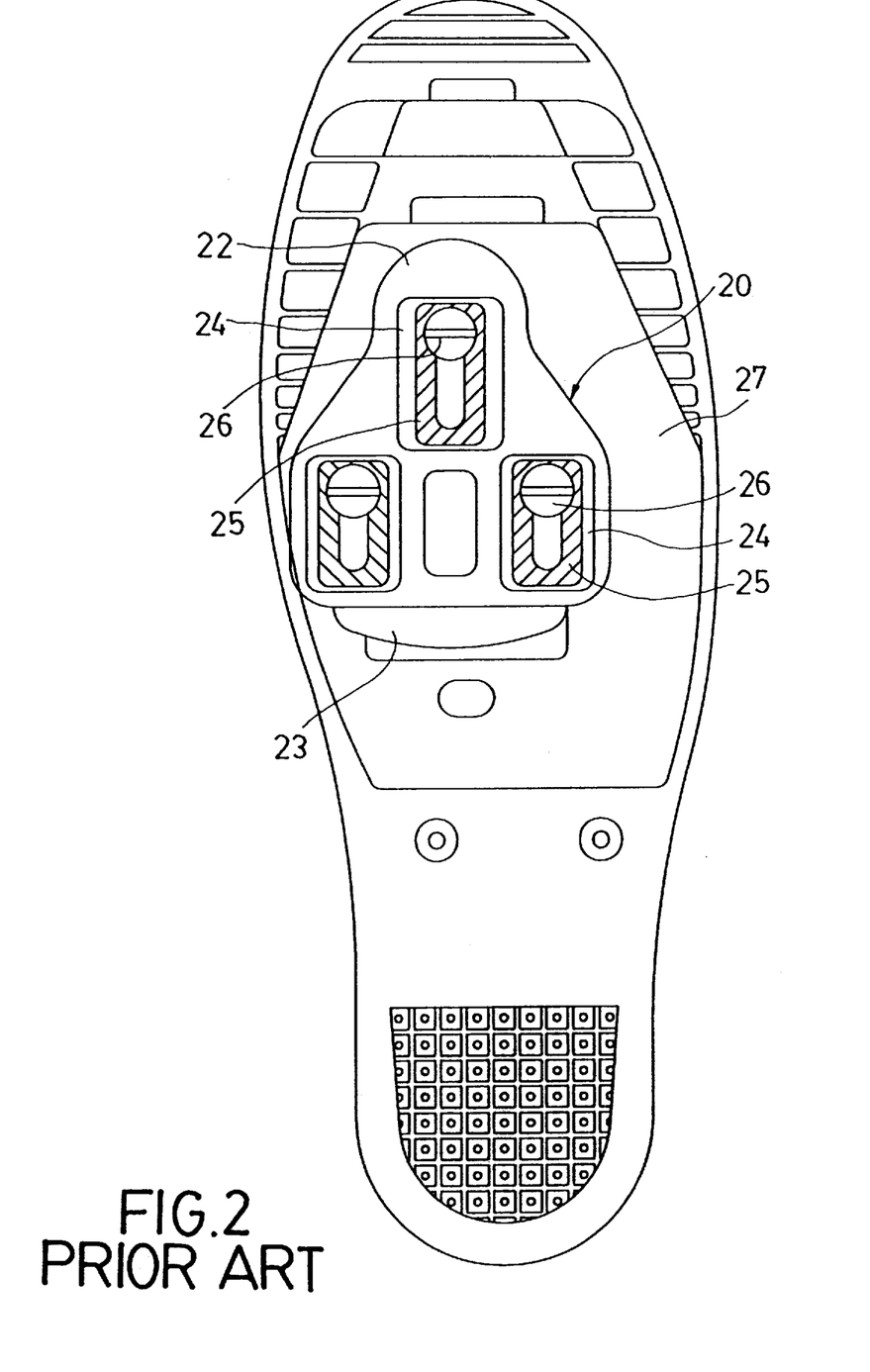
FIG. 2 is a schematic view of another conventional toe cleat on the pedal of a mountaineering bicycle fastened onto a cyclist's shoe.

Referring to FIG. 2, another form of a conventional toe cleat on the pedals for a racing bicycle is shown. The toe cleat 20 is made of plastic material, and also has front and rear engaging portions 22, 23 for engagement with the pedal body (not shown), and three slots 24 arranged triangularly therein which, along with the washers 25 and screws 26, fix the toe cleat 20 to the shoe sole 27.

Since the above toe cleats 10, 20 of the pedals have different shapes and sizes, and since the screw holes in the soles of the cyclist's shoes are located in different positions, the toe cleats 10, 20 are not suitable for fastening to all types of shoes.

SUMMARY OF THE INVENTION

The object of the present invention is to provide a foot cleat adapted to secure a cyclist's shoe to a bicycle pedal, suitable for both racing bicycles and mountaineering bicycles.

According to this invention, a foot cleat includes a foot cleat body with a second engaging major surface adapted for facing toward a first engaging surface of a petal body. The foot cleat body is formed with an elongate lock slot extending in a transverse direction, and two lock holes provided in two opposite sides relative to the elongate lock slot and aligned in a longitudinal direction. Two friction members are disposed in two lateral portions of the foot cleat body and extend outwardly of and extend outwardly of the second major engaging surface to abut against right and left tread walls of the pedal body so as to prevent slippage of the foot cleat body relative to the pedal body. Screw fasteners are inserted through the elongate lock slot and/or the lock holes in such a manner that the screw fasteners are adjustably positioned at the elongate lock slot which is adapted for registering with the screw holes in the bottom surface of the sole of a cyclist's shoe so as to be engaged selectively and threadedly in the corresponding ones of the screw holes.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Figure 3:
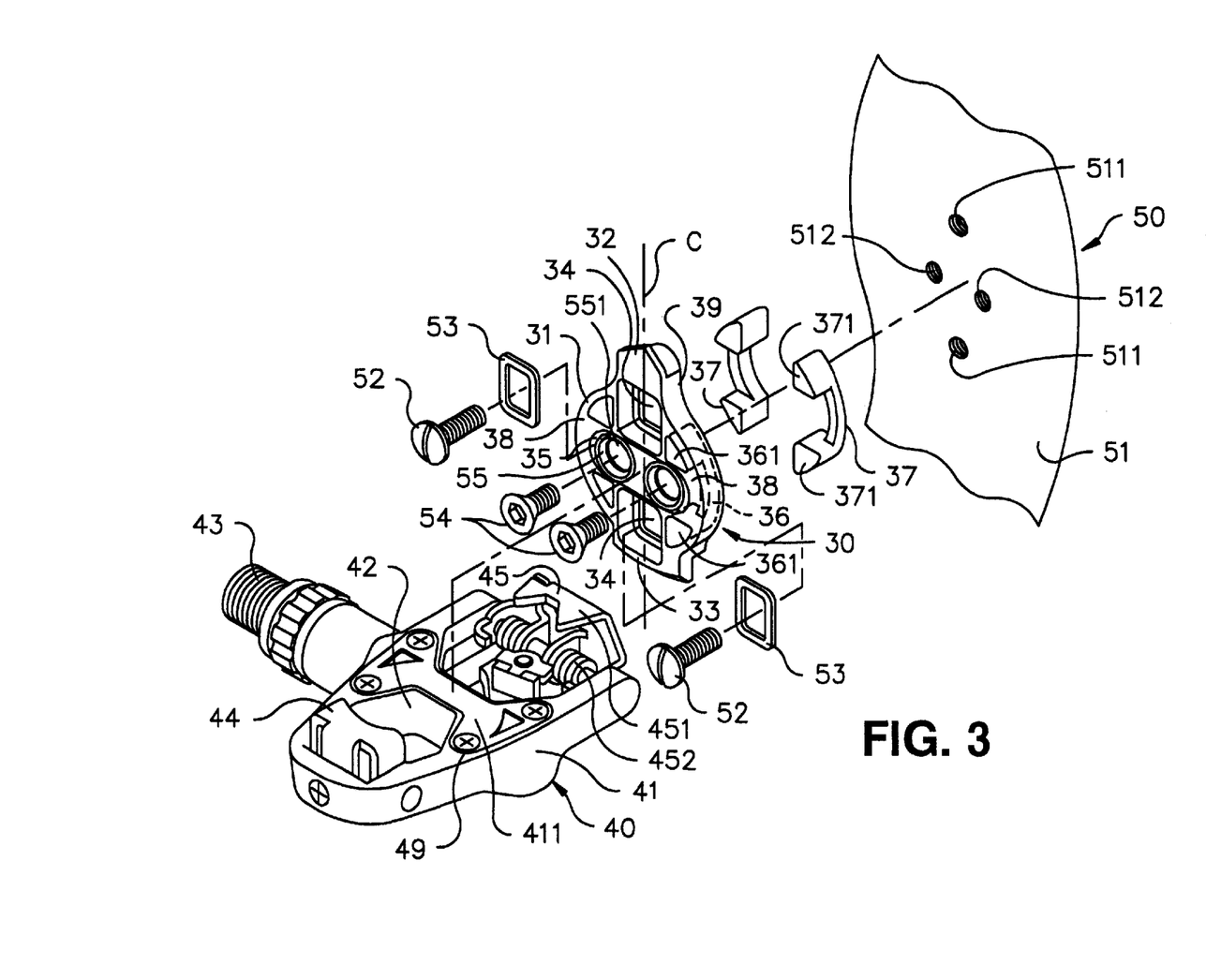
FIG. 3 is an exploded view of a first preferred embodiment of the foot cleat cooperating with a bicycle pedal according to this invention.
Figure 4:
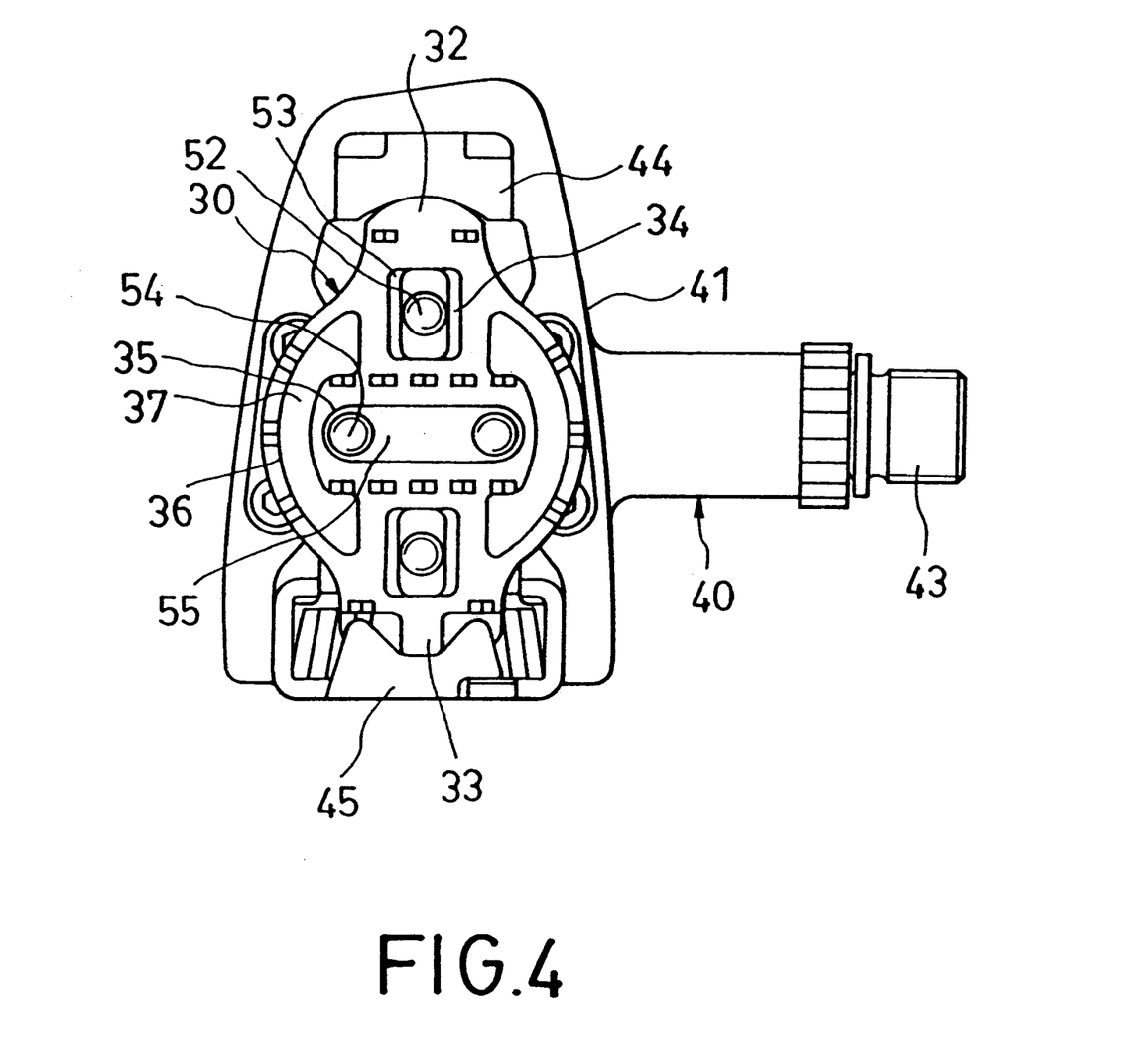
FIG. 4 is a top view of the foot cleat of the first preferred embodiment mounted on the bicycle pedal.
Figure 11:
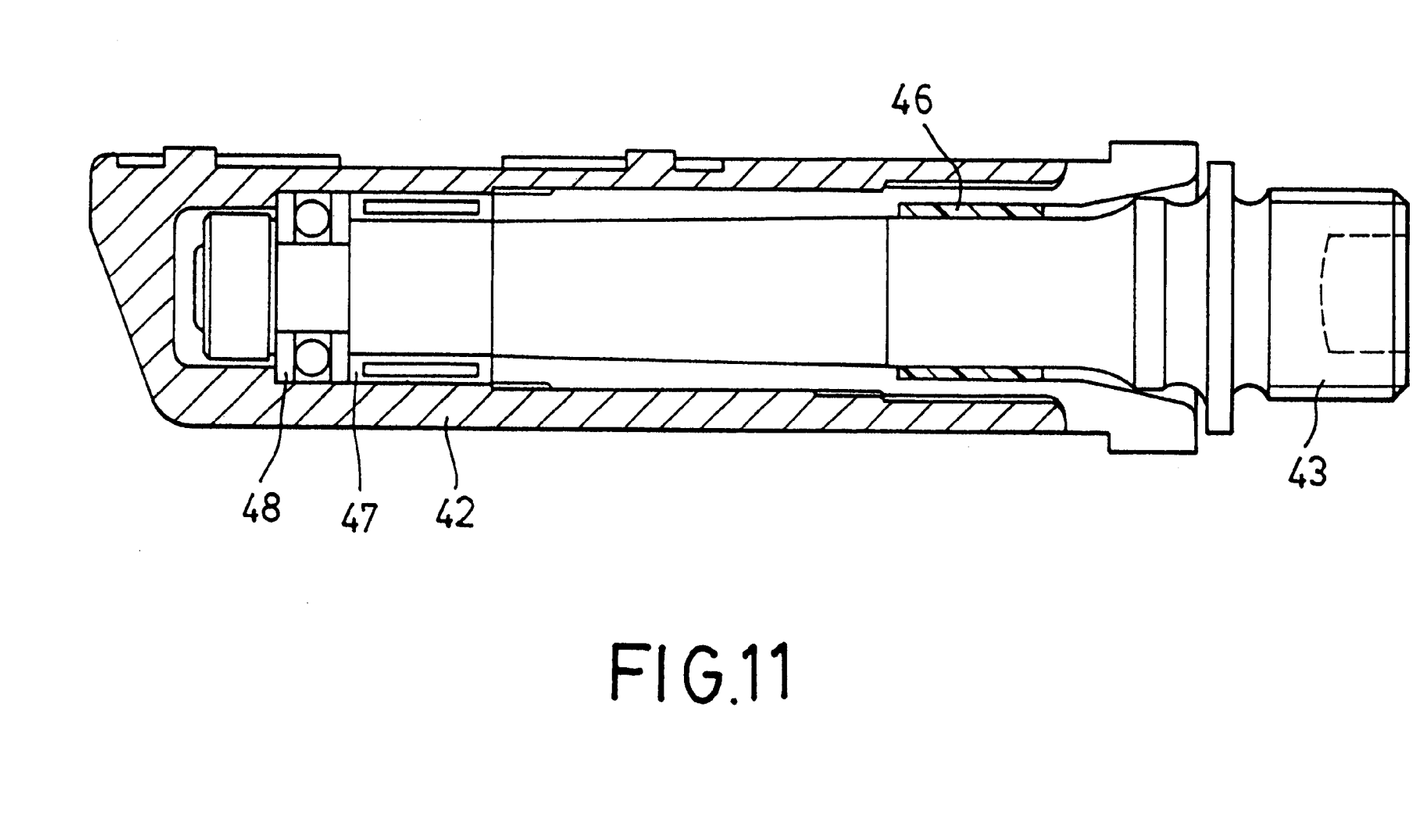
FIG. 11 is a sectional view of the pedal.

Referring to FIGS. 3 and 4, a first preferred embodiment of the foot cleat according to the present invention is shown to detachably secure a bottom surface 51 of a racing shoe 50 to a bicycle pedal assembly 40. The bicycle pedal assembly 40 has a substantially rectangular pedal body 41 and a cleat engaging member. The pedal body 41 has a central tubular portion 42 in a transverse direction for receiving a spindle 43 which is mounted rotatably on a bicycle pedal shaft (not shown) and right and left tread walls 49 which extend in a longitudinal direction and which are spaced apart from each other in the transverse direction. The right and left tread walls 49 define with the central tubular portion 42 a first engaging surface 411. With reference to FIG. 11, a Teflon bearing 46 is disposed in the tubular portion 42. A needle bearing 47 and a waterproof bearing 48 are disposed on the spindle 43 at one end thereof for preventing wearing of the spindle 43.

The cleat engaging member includes front and rear anchor members 44, 45 which are disposed on two opposite sides of the central tubular portion 42. The rear anchor member 45 is pivotally mounted around an axis that is oriented in the transverse direction, and has a grip portion 451 distal to the axis, and a biasing member 452 which is disposed to bias the grip portion 451 to turn around the axis and move toward the front anchor member 44.

The foot cleat of the first preferred embodiment includes a circular foot cleat body 30 which is of a single-piece construction, and has a second engaging major surface 31, and front and rear engaging portions 32, 33 which are engaged with the front and rear anchor members 44, 45, respectively, in such a manner that the rear engaging portion 33 is inserted in the grip portion 451 against the biasing force of the biasing member 452, thus clamping the foot cleat body 30 between the front and rear anchor members 44, 45. The foot cleat body 30 has two lateral portions 38 which are symmetrical to each other relative to a central line (C) that is parallel to the longitudinal direction such that when the second engaging major surface 31 is brought to face toward the first engaging surface 411, the lateral portions 38 will face toward the right and left tread walls 49, respectively. The foot cleat body 30 is formed with an elongate lock slot 35 which extends in the transverse direction, and two lock holes 34 which are provided at opposing sides of the elongate lock slot 35 and which are aligned with the central line (C).

Figure 6:
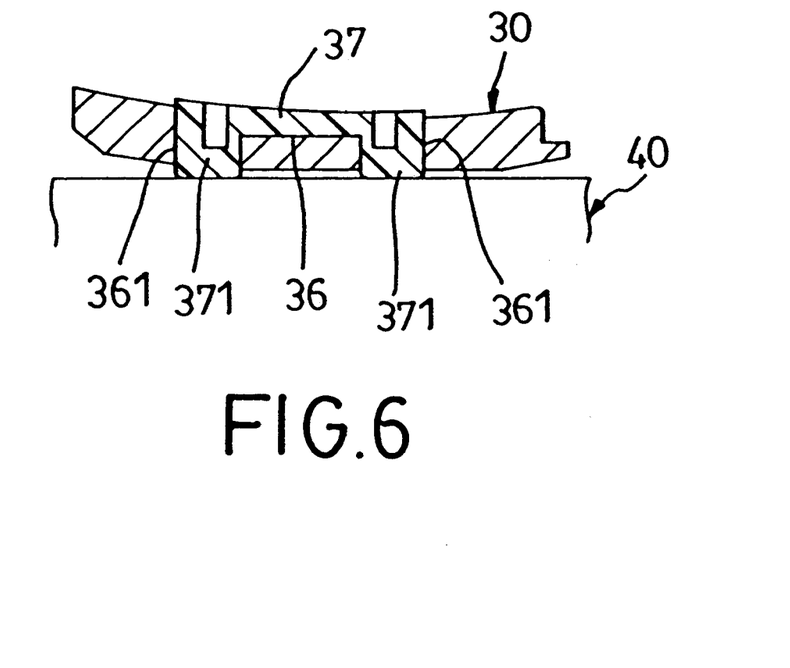
FIG. 6 is a sectional view showing the friction block on the cleat of FIG. 5 abutting against the pedal body.

In addition, the foot cleat body further has a third engaging major surface 39 opposite to the second engaging major surface 31, and two receiving chambers 36 which are formed in the second engaging major surface 31 and which are disposed in the lateral portions 38 respectively. Each receiving chamber 36 defines two through holes 361 at two ends thereof and communicating the second and third engaging major surfaces 31, 39. With reference to FIG. 6, two elongate friction parts 37 having a friction force greater than that of the second major engaging surface are shown. Each elongate friction part 37 is fitted snugly in the respective receiving chamber 36 by insertion thereof into the third engaging major surface 39, and has two friction protruded ends 371 which are spaced apart from each other in the longitudinal direction and which extend through the through holes 361, respectively, and outwardly of the second engaging major surface 31 to abut against the respective one of the right and left tread walls 49, thereby preventing slippage of the foot cleat body 30 relative to the pedal body 41.

Figure 5:
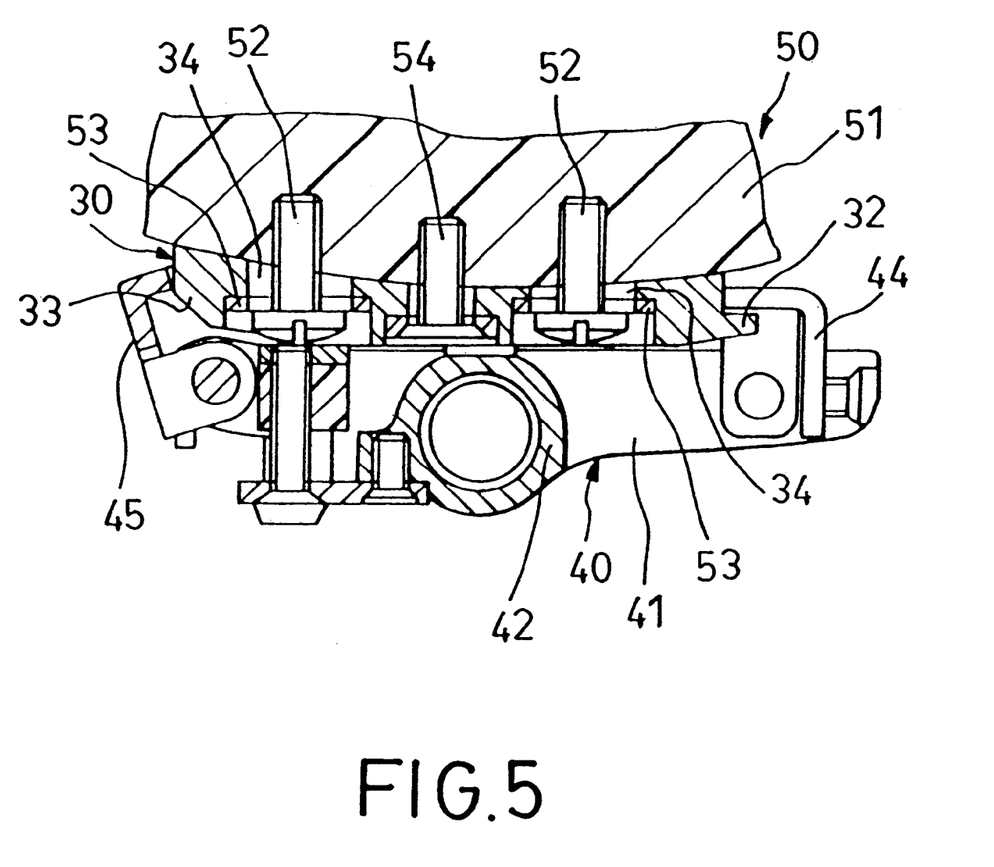
FIG. 5 is a sectional view of the assembly of the foot cleat of the first preferred embodiment and the pedal fastened onto a cyclist's shoe.

The engagement of the foot cleat body 30 with the shoe sole will now be described with reference to FIGS. 4 and 5. When it is desired to fasten the foot cleat body 30 on the bottom surface 51 of the sole of a racing shoe 50 with screw holes 511 aligned the longitudinal direction, two screw fasteners 52 are passed respectively through washers 53 disposed in the lock holes 34 and fixed threadedly in the screw holes 511. On the other hand, if the bottom surface 51 of the shoe 50 is formed with screw holes 512 which are aligned in the transverse direction, the foot cleat body 30 can also be fastened on the bottom surface 51 by inserting screw fasteners 54 into the two circular holes 551 in an elongate washer 55 disposed in the elongate lock slot 35 and into the screw holes 512 for engagement therewith.

Figure 7:
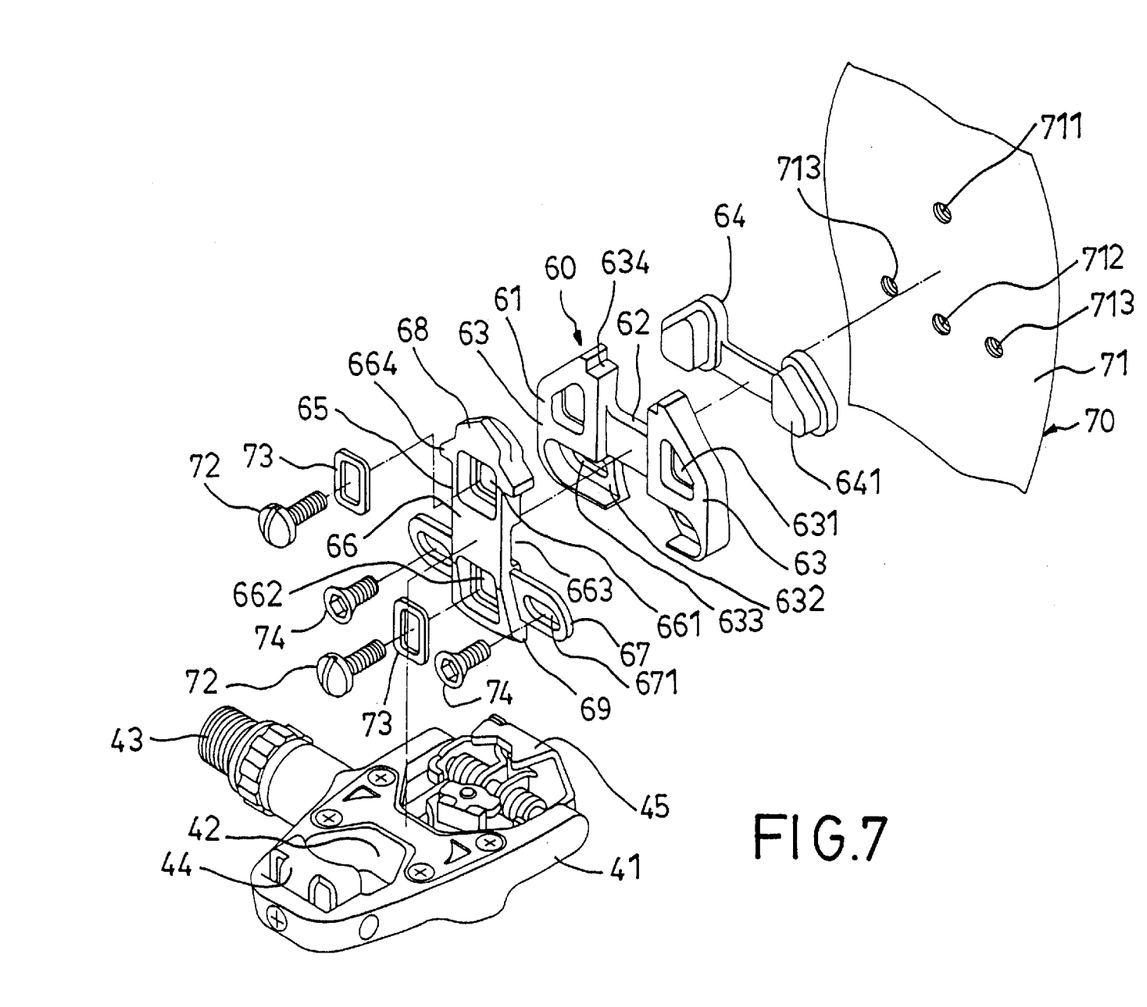
FIG. 7 is an exploded view of a second preferred embodiment of the foot cleat cooperating with a bicycle pedal according to this invention.
Figure 8:
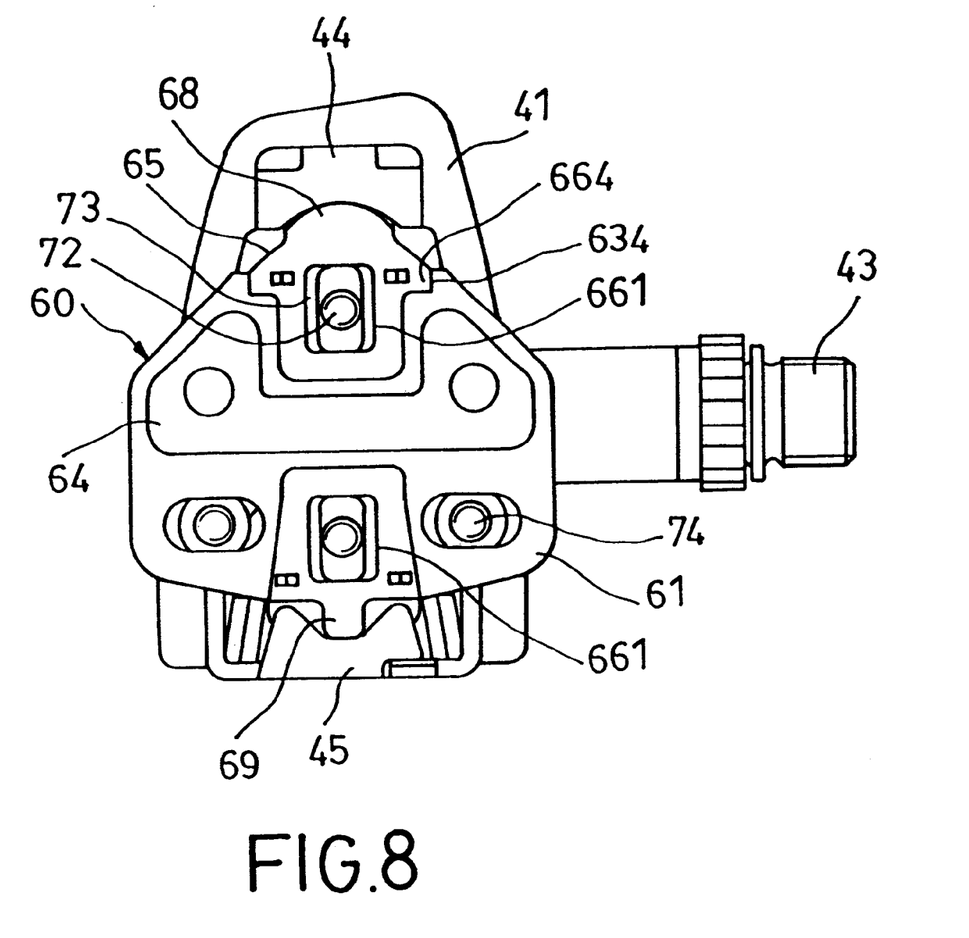
FIG. 8 is a top view of the foot cleat of the second preferred embodiment mounted on the bicycle pedal.

FIGS. 7 and 8 show a second preferred embodiment of the foot cleat according to this invention. In this embodiment, the foot cleat body 60 includes a transverse cleat part 61 and a longitudinal cleat part 65 which is snugly fitted on and which criss cross with the transverse cleat part 61.

Figure 10:
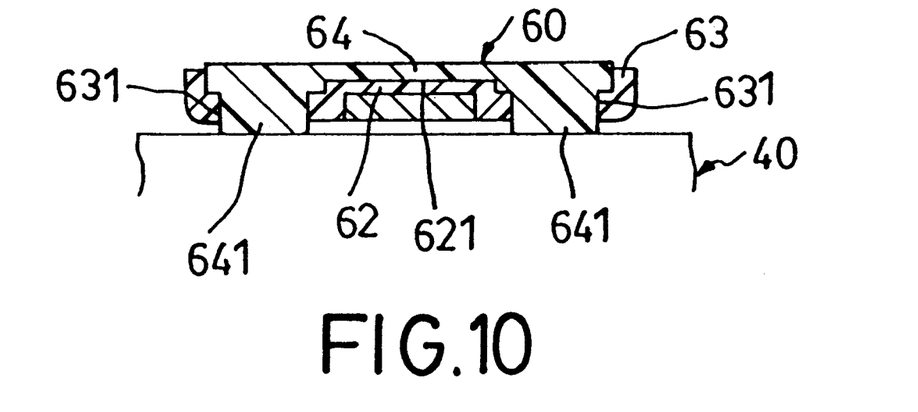
FIG. 10 is a sectional view showing the friction block on the cleat of FIG. 9 abutting against a pedal body.

The transverse cleat part 61 is made of plastic material, and has a first coupling portion 62, and two wing portions 63 which are formed on two opposing sides of the first coupling portion 62 and which have a respective a receiving chamber 631. A receiving groove 621 is formed in the transverse cleat part 61 between the receiving chambers 631 for receiving a friction block 64, as best shown in FIG. 10. The friction block 64 has two friction protrusions 641 which extend outwardly of the receiving chambers 631, respectively. In addition, the wing portions 63 have two engaging slots 634 at the front ends thereof. Two lock portions are defined by two receiving grooves 632 and two first elongate holes 633, respectively.

The longitudinal cleat part 65 is made of metal material, and also has front and rear engaging portions 68, 69 for engagement with the front and rear anchor members 44, 45 of the pedal body 41, respectively. In addition, the longitudinal cleat part 65 is provided with the two lock holes 661, 662, and a second coupling portion 66 therebetween. The second coupling portion 66 has an engaging recess 663 into which the first coupling portion 62 is press-fitted. Two engaging blocks 664 extend laterally from the front end of the longitudinal cleat part 65 for engagement with the corresponding engaging slots 634. The longitudinal cleat part 65 further has two lugs 67 which are disposed adjacent to the rear lock hole 662 and which extend in the transverse direction. Each lug 67 has a second elongate hole 671 aligned with the first elongate hole 633 in the transverse cleat part 61.

Figure 9:
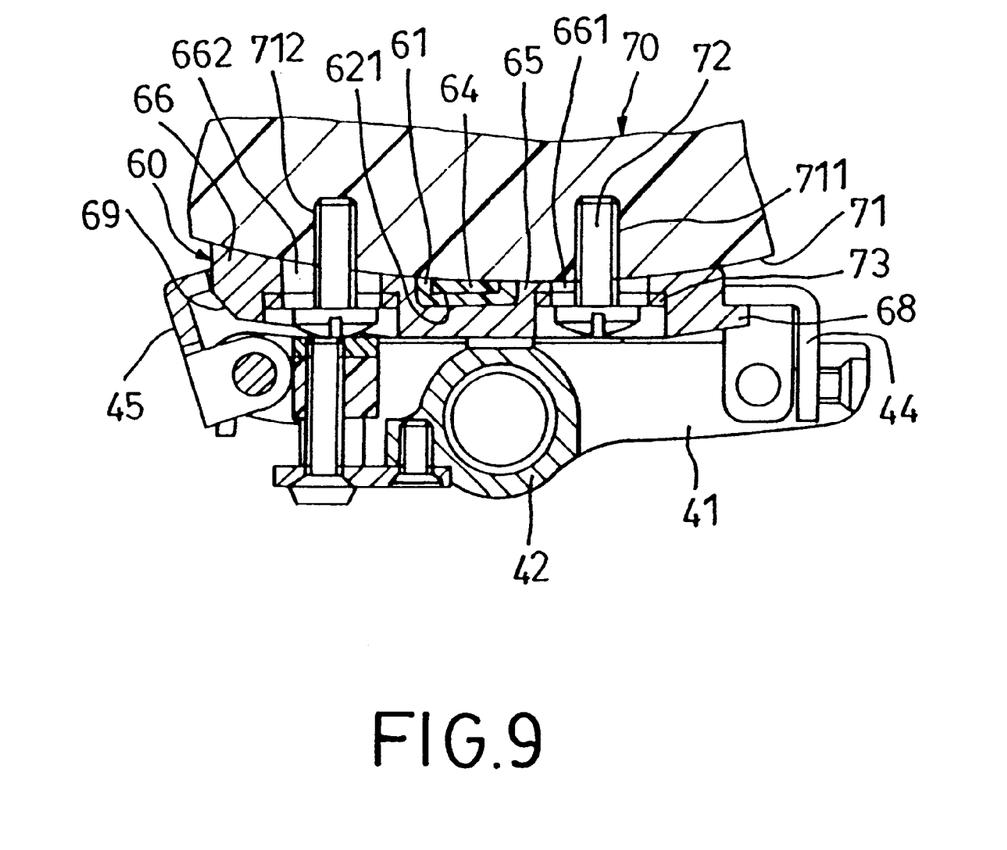
FIG. 9 is a sectional view of the assembly of the foot cleat of the second preferred embodiment with the pedal fastened onto a cyclist's shoe.

The fastening of the foot cleat body 60 onto the bottom surface 71 of the sole of a mountaineering shoe 70 will now be described with reference to FIGS. 7 to 9. Two screw fasteners 72 may be used, which are passed through the washers 73 disposed in the lock holes 661, 662 and into the screw holes 711, 712 of the shoe 70 aligned in the longitudinal direction for engagement therewith. Alternatively, only one screw fastener 72 and two additional screw fasteners 74 can be used. The screw fastener 72 is passed through the washer 73 of the front lock hole 661 into the front screw hole 711 to engage therewith, while the two screw fasteners 74 are passed through the first and second elongate holes 671, 633 and are threadedly secured in the two screw holes 713 of the shoe 70 aligned in the transverse direction.

As illustrated, the foot cleat body 30, 60 of the foot cleat according to this invention can be fastened different kinds of mountaineering and racing shoes having different screw holes by suitably changing the locking positions of screw fasteners 52, 54, 72, 74 on the foot cleat body 30, 60.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A foot cleat for detachably securing a bottom surface of a cyclist's shoe to a bicycle pedal assembly, the bottom surface of the cyclist's shoe having screw holes, the bicycle pedal assembly having:

a pedal body having a central tubular portion that extends in a transverse direction and that is disposed rotatably on a bicycle pedal shaft, and right and left tread walls that extend in a longitudinal direction and that are spaced apart from each other in the transverse direction, the right and left tread walls defining with the central tubular portion a first engaging surface, and a cleat engaging member including front and rear anchor members disposed on two opposite sides relative to the central tubular portion in the longitudinal direction, the rear anchor member being pivotally mounted around an axis oriented in the transverse direction and having a grip portion distal to the axis, and a biasing member disposed to bias the grip portion to turn around the axis to move toward the front anchor member, said foot cleat comprising:

a foot cleat body having a second engaging major surface adapted for facing toward the first engaging surface, and front and rear engaging portions adapted to be engaged respectively in the front and rear anchor members in such a manner that said rear engaging portion is inserted in the grip portion against a biasing force of the biasing member to clamp said foot cleat body between the front and rear anchor members, said foot cleat body having two lateral portions symmetrical to each other relative to a central line parallel to the longitudinal direction such that when said second engaging major surface is brought to face toward the first engaging surface, said lateral portions will face toward the right and left tread walls respectively, said foot cleat body being formed with an elongate lock slot extending in the transverse direction, and two lock holes provided in two opposite sides relative to said elongate lock slot and aligned with the central line;

two friction members respectively disposed in said lateral portions, and extending outwardly of said second engaging major surface so as to be adapted to abut against the right and left tread walls respectively to prevent slippage of said foot cleat body relative to the pedal body; and screw fasteners passed through at least one of said elongate lock slot and said lock holes in such a manner that said screw fasteners are adjustably positioned at said elongate lock slot, said elongate lock slot being adapted for registering with the screw holes in the bottom surface of the cyclist's shoe so as to be engaged selectively and threadedly in the corresponding ones of the screw holes.

2. The foot cleat as claimed in claim 1, wherein said foot cleat body further has a third engaging major surface disposed opposite to said second engaging major surface, and two receiving chambers formed in said second engaging major surface and disposed in said lateral portions respectively, each of said receiving chambers defining at least one through hole communicating said second and third engaging major surfaces;

said friction members being fitted snugly and respectively in said receiving chambers by insertion thereof into said third engaging major surface, and extending respectively through said through holes and outwardly of said second engaging major surface to abut against the right and left tread walls, respectively.

3. The foot cleat as claimed claim 2, wherein each of said friction members includes two protruded friction ends spaced apart from each other in the longitudinal direction and extending outwardly of said second engaging major surface.

4. The foot cleat as claimed claim 3, wherein said foot cleat body has a single-piece construction.

5. The foot cleat as claimed in claim 2, wherein said foot cleat body includes a transverse cleat part and a longitudinal cleat part snugly fitted on said transverse cleat part such that said transverse cleat part crisscrosses said longitudinal cleat part.

6. The foot cleat as claimed in claim 5, wherein said transverse cleat part defines said elongate lock slot and has a first coupling portion, and said longitudinal cleat part defines said lock holes and having a second coupling portion between said lock holes such that said first coupling portion is press-fitted in said second coupling portion, thereby disposing said transverse cleat part in a crisscrossing arrangement with said longitudinal cleat part.

7. The foot cleat as claimed in claim 6, wherein said elongate lock slot has two lock portions, each formed with a receiving groove and a first elongate hole, said longitudinal cleat part further having two lugs disposed respectively at opposite sides of and in line with one of said lock holes in the transverse direction, each of said lugs having a second elongate hole aligned with said first elongate hole for passage of the respective ones of said screw fasteners.

8. The foot cleat as claimed in claim 7, wherein said receiving chambers are disposed at two sides of said first coupling portion, respectively.

9. The foot cleat as claimed in claim 1, further comprising an elongate washer disposed in said elongate lock slot, and said foot cleat having two circular holes adapted for registering with the screw holes.

* * * * *